United States Patent

Matsuda et al.

[15] 3,681,538

[45] Aug. 1, 1972

[54] TELEPHONE CIRCUITS UTILIZING NON-LINEAR ELEMENTS

[72] Inventors: Ryoichi Matsuda; Isao Kawashima; Masaaki Terai, all of Tokyo, Japan

[73] Assignee: Nippon Telegraph and Telephone Public Corporation, Tokyo, Japan

[22] Filed: Feb. 4, 1971

[21] Appl. No.: 112,664

[30] Foreign Application Priority Data

Feb. 7, 1970 Japan..........................45/10508

[52] U.S. Cl...............................................179/81 A
[51] Int. Cl................................................H04m 1/58
[58] Field of Search............................179/81 A, 81 R

[56] References Cited

UNITED STATES PATENTS 3,548,111 12/1970 Kleissl.........................179/81 A
3,582,563 6/1971 Cragg..........................179/81 R
2,775,649 12/1956 Pockock......................179/81 A

*Primary Examiner*—Kathleen H. Claffy
*Assistant Examiner*—William A. Helvestine
*Attorney*—Chittick, Pfund, Birch, Samuels & Gauthier

[57] ABSTRACT

In a telephone circuit equipted with an anti-sidetone circuit of the type comprising a transmitter, a receiver, a balancing network, and a hybrid coil intercoupling the transmitter, the receiver, and the balancing network, an artificial subscriber's line including a non-linear resistance element which varies its resistance in accordance with the voltage across the telephone lines is connected between the telephone lines and the telephone circuit, a non-linear capacitance element which varies its capacitance in accordance with the D.C. voltage across the telephone lines is included in a balanced circuit network, and a constant direct current device is connected in series with the transmitter.

12 Claims, 15 Drawing Figures

INVENTORS
RYOICHI MATSUDA
ISAO KAWASHIMA
MASAAKI TERAI

BY Chittick, Pfund, Birch, Samuels & Gauthier
ATTORNEYS

INVENTORS
RYOICHI MATSUDA
ISAO KAWASHIMA
MASAAKI TERAI

BY Chittick, Pfund, Birch, Samuels & Gauthier
ATTORNEYS

INVENTORS
RYOICHI MATSUDA
ISAO KAWASHIMA
MASAAKI TERAI

BY Chittick, Pfund, Birch, Samuels & Gauthier
ATTORNEYS

INVENTORS

RYOICHI MATSUDA
ISAO KAWASHIMA
MASAAKI TERAI

BY Chittick, Pfund, Birch, Samuels & Gauthier
ATTORNEYS

INVENTORS

RYOICHI MATSUDA
ISAO KAWASHIMA
MASAAKI TERAI

BY Chittick, Pfund, Birch, Samuels & Gauthier
ATTORNEYS

TELEPHONE CIRCUITS UTILIZING NON-LINEAR ELEMENTS

BACKGROUND OF THE INVENTION

This invention relates to a telephone circuit and more particularly a telephone circuit utilizing a non-linear element for automatically suppressing side tone and providing an adequate sending and receiving level in accordance with the length of the subscriber's line connected to the telephone circuit.

The side tone or the working attenuation from a transmitter to a receiver across a telephone circuit is not only unnecessary but also objectionable to satisfactory communication. For this reason, suppression of the side tone presents an important problem in the design of the telephone circuit. In prior art telephone circuits, in spite of large variations in the line impedance with the length of the subscriber's line or the diameter of the telephone cable, since the impedance means of the anti-sidetone circuit which are provided for the purpose of eliminating the effect of such variations in the line impedance are comprised by linear circuit elements it has been impossible to efficiently suppress the side tone over a wide variety of the subscriber's lines. When the sensitivity of the transmitter and receiver is high, this problem becomes more serious and renders it impossible to use acoustic apparatus and amplifiers recently developed for use in telephone circuits.

The difference in the length of the subscriber's line connected to the telephone set causes variations in the sending and receiving level of the transmitter and receiver. For this reason, it has been desired to provide an improved telephone circuit capable of automatically maintaining a constant sending and receiving level irrespective of the location of the telephone set.

To accomplish this object, it has been proposed to incorporate a non-linear element into a telephone circuit so as to automatically maintain the transmission loss of the speech at an adequate level and to automatically suppress, the undesirable side tone. According to one proposal, a non-linear resistor is connected in series or parallel with the transmitter, or the receiver or the winding of a hybrid coil for providing an additional loss where the length of the telephone line is short. Such additional loss can also be provided by connecting a non-linear resistor in series with the telephone line as disclosed in a paper of the title "Design of an Automatic Sensitivity Control for a New Subscribers Telephone Set" in P.I.E.E. 106 [7], 1955 and U.S. Pat. No. 3,117,295. Further, in a paper of the title "An Improved Circuit for the Telephone Set" in B.S.T.J. 32 [3], 1953 there is disclosed an arrangement by which a non-linear resistance is connected in parallel with the telephone line for providing an additional loss and a non-linear resistance is connected in parallel with a balancing network for compensating for the variation in the line impedance as viewed from the line terminals of the anti-sidetone circuit.

All of the above described proposals have failed to automatically maintain the sending and receiving level of the transmitter and receiver at a constant level and to efficiently suppress the side tone because non-linear elements that have necessary characteristics were not available and because a suitable circuit arrangement was not developed.

In order to always efficiently suppress the side tone irrespective of the length of the line and to maintain a constant sending and receiving tone it is desirable to construct the telephone circuit which performs as if a subscriber's line of a definite length were connected between the telephone office and a telephone set provided with an anti-sidetone means.

Further, with a subscriber's line of different length, since the resistance component and the capacitive component of the line impedance vary with the length thereof it is desirable to include a capacitive element manifesting a non-linear property in the balancing network of the telephone circuit.

Further, where a carbon transmitter is used as the transmitter means, it is not only necessary to maintain the transmission loss between the telephone set and the office at a constant value but also to maintain the direct current supplied to the telephone set at a definite value in order to maintain the sending level transmitted to the office at a constant value.

SUMMARY OF THE INVENTION

Accordingly, it is an object of this invention to provide an improved telephone circuit capable of maintaining the transmission loss between the anti-sidetone circuit and the office at a substantially constant value by connecting an artificial subscriber's line comprising a non-linear resistor and a capacitor between the subscriber's line and the anti-sidetone circuit.

Another object of this invention is to provide a novel telephone circuit wherein a portion of the balancing network included in the anti-sidetone circuit is comprised by a non-linear capacitor that varies its capacitance in accordance with the variation in the D.C. voltage impressed upon the telephone set thus minimizing the side tone even when the capacitive component of the line impedance varies.

Still another object of this invention is to provide an improved telephone circuit wherein a constant direct current device is connected in series with the transmitter so as to maintain the sensitivity of the transmitter at a constant level indifferent to the variation of the line current flowing into the telephone set whereby the speech level transmitted to the office from the transmitter is maintained at a constant level and the deterioration of the carbon granules packed in the transmitter caused by excessive current can be effectively precluded.

A further object of this invention is to provide a novel telephone circuit wherein direct current from a constant direct current device that supplies direct current to the transmitter is prevented from flowing through the winding of a hybrid coil so as to prevent magnetic saturation of the core by the direct current thereby reducing the weight and size of the hybrid transformer than the prior art.

Still further object of this invention is to provide a novel telephone circuit wherein the sending and receiving level of the transmitter and receiver is made constant, the side tone is suppressed or minimized and a push button dial can be used.

According to one aspect of this invention there is provided a telephone circuit of the type comprising an anti-sidetone circuit having a hybrid transformer and four terminal pairs wherein the first terminal pair is connected to receiving means, the second terminal pair is connected to transmitting means and the third terminal pair is connected to a balancing network, characterized in that an artificial subscriber's line is connected between the telephone lines and the fourth terminal pair of the anti-sidetone circuit, that the artificial subscriber's line includes at least one capacitor connected in parallel with the telephone lines and the fourth terminal pair, and at least one non-linear resistor is connected in series with the telephone lines and the fourth terminal pair, that the non-linear resistor varies its resistance value in accordance with the direct current flowing through the telephone lines, that the balancing network includes a non-linear capacitor element which varies its capacitance in accordance with the D.C. voltage across the telephone lines, and that a constant direct current device is connected in series with the transmitting means.

According to another aspect of this invention, there is provided a telephone circuit equipted with an anti-sidetone circuit of the type comprising transmitting means, receiving means, a balancing network, and a hybrid coil intercoupling the transmitting means, the receiving means, and the balancing network connected between the hybrid coil and the transmitting and receiving means, characterized in that an artificial subscriber's line is connected between telephone lines and the telephone circuit, that the artificial subscriber's line includes at least one capacitance element and at least one non-linear resistance element which varies its resistance in accordance with the D.C. voltage across the telephone lines, that the balancing network includes a non-linear capacitance element which varies its capacitance in accordance with the D.C. voltage across the telephone lines, and that a constant direct current device is connected in series with the transmitting means.

The artificial subscriber's line may be comprised by at least one non-linear resistance element connected in series with the telephone lines and at least one capacitance element connected in parallel with the telephone lines, the non-linear resistance element and the capacitance element being connected in the type of L, T or $\pi$.

The non-linear capacitance element included in the balancing network may be comprised by a reversely biased selenium rectifier element or a barium titanate semiconducting ceramic.

BRIEF DESCRIPTION OF THE DRAWINGS

Further objects and advantages of the invention will be more fully understood from the following detailed description taken in conjunction with the accompanying drawings in which.

DESCRIPTION OF THE PREFERRED EMBODIMENTS

Figure 1:
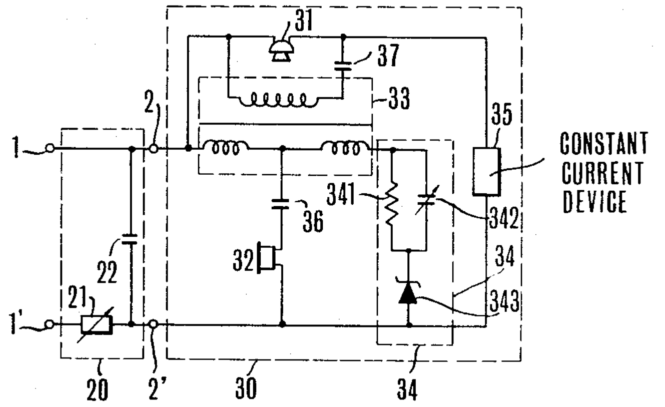
FIG. 1 shows a connection diagram to explain the principle of the novel telephone circuit.

With reference first to FIG. 1 of the accompanying drawing, the novel telephone circuit shown therein comprises input-output terminals 1 and 1' connected to a subscriber's line, an artificial subscriber's line 20 and an anti-sidetone circuit 30 which are connected together at terminals 2 and 2'. The artificial subscriber's line 20 is of the L type and is comprised by a non-linear resistor 21 having a non-linear D.C. voltage-current characteristic and a capacitor 22. The anti-sidetone circuit 30 comprises a transmitter 31, a receiver 32, a bridge type hybrid transformer 33, an impedance device corresponding to the impedance of the subscriber's line or a balancing network 34, a constant direct current device 35 connected in series with the transmitter 31 and D.C. blocking capacitors 36 and 37 associated with the transmitter and receiver respectively. The balancing network 34 comprises a parallel circuit of a resistor 341 and a variable capacitor 342 and constant voltage diodes, for example a Zener diode 343 (hereinafter simply called as a Zener diode) connected in series with the parallel circuit, the opposite terminal thereof being connected to one terminal of hybrid transformer 33. The variable capacitor 342 is of the non-linear type whose capacitance varies in accordance with the D.C. voltage impressed thereacross.

The non-linear resistance element 21 of the artificial subscriber's line 20 varies its resistance in accordance with the direct current supplied to the telephone set, said direct current varying with the loss in the subscriber's line. In other words, when the line resistance is small so that a large direct current is supplied to the subscriber's terminals 1 and 1', the value of the non-linear resistance element 21 increases thus increasing the loss in the artificial subscriber's line 20. On the other hand, where the line loss is large, the resistance value of the non-linear resistance element decreases, thereby decreasing the loss in the artificial subscriber's line 20. For this reason, it is possible to automatically maintain the sum of the loss in the artificial subscriber's line 20 and that in the subscriber's line at a substantially constant level over a wide range of the length of the subscriber's line whereby it is possible to assure communications of constant level for both sending and receiving.

It is also possible to automatically maintain at a constant value the resistance component of the side of the line as viewed from the anti-sidetone circuit 30 across input terminals 2 and 2' irrespective of the line loss. As above described, the balancing network 34 is comprised by a parallel circuit of resistor 341 and non-linear capacitor 342 and the Zener diode 343 connected in series with the parallel circuit. The non-linear capacitor 342 varies its capacitance in accordance with the voltage applied thereacross which is varied by the line loss. Stated another way, when the line loss is small and hence the capacitance of the capacitor is small or when the D.C. terminal voltage across non-linear capacitor 342 is high, the capacitance would be small, whereas when the line loss is high and hence the line capacity is large, or when the D.C. terminal voltage across the non-linear capacitor is low, the capacitance thereof would be high. For this reason, even when the telephone set is connected to lines of different losses the non-linear capacitance 342 would automatically compensate for the capacitance component of the line impedance which varies over a wide range.

Thus, one of the advantageous feature of the novel telephone circuit is that the resistance component of the line impedance is compensated for by the artificial subscriber's line including a non-linear resistance element and that the capacitance component of the line impedance is automatically compensated for by the non-linear capacitor included in the balancing network thereby effectively suppressing the side tone for subscriber's lines of the length or type varying over a wide range.

As is evident from FIG. 1, the balancing network with one terminal connected to hybrid transformer 33 includes the Zener diode 343 which is connected in parallel with the constant direct current device 35 which is connected in series with transmitter 31. As a consequence, the constant direct current device 35 supplying direct current to transmitter 31 will be biased by the Zener diode 343 whereby the source 35 always supplies a constant direct current to transmitter 31 irrespective of the variations in the line loss. In this manner, according to this invention, it is possible to substantially eliminate variation in sensitivity influenced by the direct current supplied to the transmitter. And yet it is possible to make sufficiently high the A.C. impedance of the constant direct current device 35. Accordingly, in spite of using this device the transmitter and the receiver are maintained in an electrical conjugate relation in the same manner as the conventional anti-sidetone circuit.

Furthermore, according to this invention, since the direct current supplied to the telephone set from the line varied by the line loss is divided among the constant direct current device 35 and the resistor 341 of the balancing network 34 and since the flow of the constant direct current though one winding of the hybrid coil from constant direct current device 35 is blocked by capacitor 37 it is possible to greatly reduce the direct current flowing through the winding of the hybrid transformer 33 than in the prior telephone circuit and yet it is possible to greatly increase the variation in the D.C. terminal voltage across the non-linear capacitor in accordance with the magnitude of the line loss. Thus, it is not necessary to increase the air gap in the core for the purpose of decreasing inductance variation due to superposition of the D.C. component thus providing the desired value of inductance with a core of small size. As a consequence it is possible to reduce the size and weight of the hybrid transformer to about one-fourth of the prior hybrid transformer.

Figure 2:
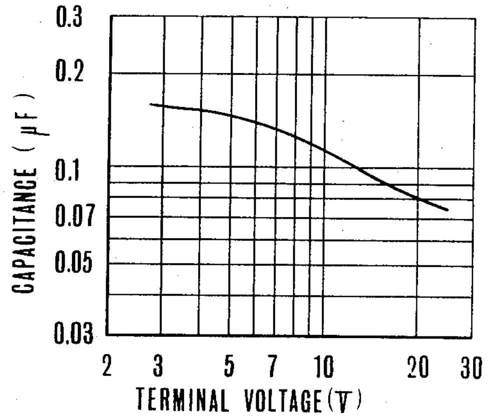
FIG. 2 shows a characteristic curve of a non-linear capacitor employed in this invention.

With particular reference to non-linear capacitor 342, in the absence of the direct constant current device 35, it is necessary that the capacity of the capacitor be proportional to −1 power or −2 powers of the D.C. terminal voltage but where the parallel circuit including the constant direct current device is used, it is sufficient to use a non-linear capacitor having a capacity proportional to −one-half power of the D.C. terminal voltage thereof. FIG. 2 shows the characteristics of such a non-linear capacitor. Such characteristic can be readily provided by using the characteristic of a reversely biased selenium rectifier or a barium titanate semiconductor ceramic.

The description up to this point refers to the principle of this invention. Examples of resistor device 21 having the non-linear D.C. voltage-current characteristic and the direct constant current device are as follows. Such a resistor device and a constant direct current device may be provided by a well known field effect element utilizing the Shottky effect but it is also possible to use a combination of a resistor and a transistor.

Figure 3:
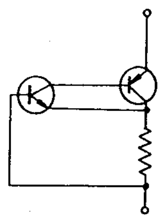
FIGS. 3 to 6 inclusive show different embodiments of two terminal networks comprising the non-linear resistance circuits and the D.C. constant current circuits utilized in this invention.
Figure 4:
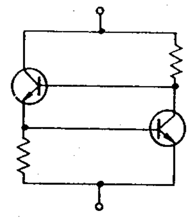
Figure 5:
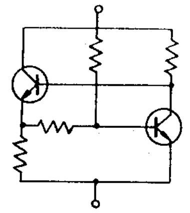

FIGS. 3 to 6 inclusive illustrate some examples of the combination of non-linear resistor device 21 and direct constant current device 35. In FIG. 3 the non-linear resistor and the constant current circuit are comprised by a combination of two transistors of the opposite polarity and a resistor. The non-linear resistor and the constant D.C. current circuit are comprised by two transistors and two resistors in FIG. 4 whereas by two transistors and four resistors in FIG. 5. In the modified arrangement shown in FIG. 6 the non-linear resistor and the constant D.C. current circuits are comprised by a pair of symmetrical circuits each including two transistors of the opposite polarity, three resistors and a single diode. Since in each of these circuits the non-linear resistance characteristic and the constant current characteristic are provided by the well known bias voltage-output current characteristic of the transistor it is believed unnecessary to describe them in detail.

Figure 7:
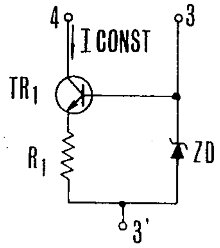
FIGS. 7 and 8 illustrate examples of three terminal networks comprising the D.C. constant current circuits utilized in this invention.

In the example shown in FIG. 7, the direct constant current device is comprised by a transistor TR1, a resistor R1 and a Zener diode ZD. The voltage impressed across terminals 3 and 3' is converted into a constant voltage by the operation of the Zener diode ZD, which is utilized as the bias voltage for transistor TR1 so as to obtain a constant current at terminal 4.

Figure 8:
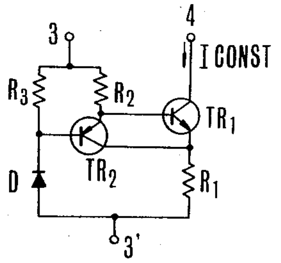
Figure 9:
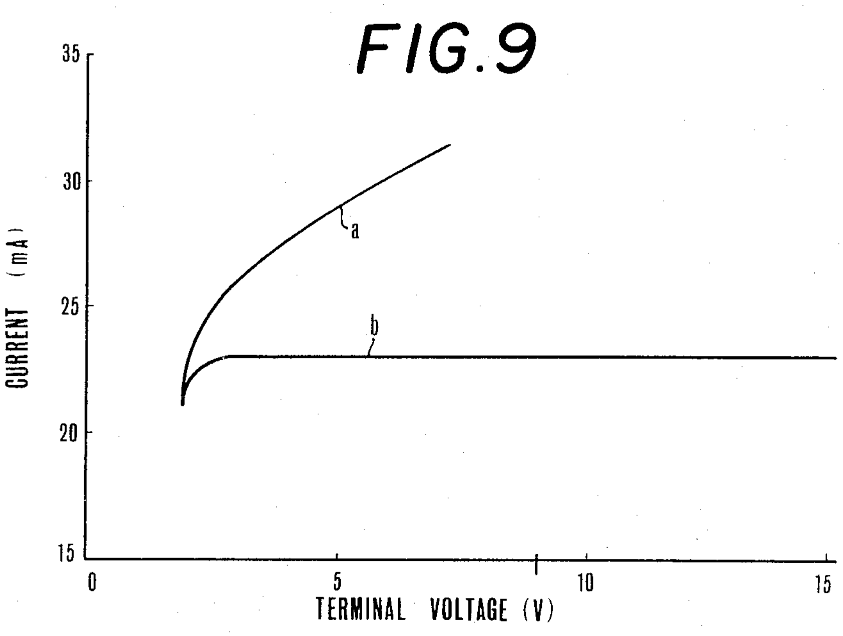
FIG. 9 is a graph showing the characteristic curves of the non-linear resistor and the constant direct current device employed in this invention.

In the modification shown in FIG. 8, the constant current is produced by a combination of two transistors TR1 and TR2 of the opposite polarity, three resistors R1, R2 and R3 and a single diode D. It is to be understood that the combination of the non-linear resistor and the constant current source is not limited to those illustrated in FIGS. 3 through 8 and that identical characteristics may be realized by other connections as for example by connecting transistors in the Darlington form, or by exchanging the PNP junction and the NPN junction the transistors, or by reversing the connection of the diode or the Zener diode. Such electronic circuit elements or field effect elements can be fabricated in integrated circuits together with another circuit elements. FIG. 9 shows a typical voltage-current characteristic (curve a) of the non-linear resistor and the constant current characteristic (curve b) of the constant current source obtainable with the field effect elements or the electronic circuits described above.

Figure 10A:
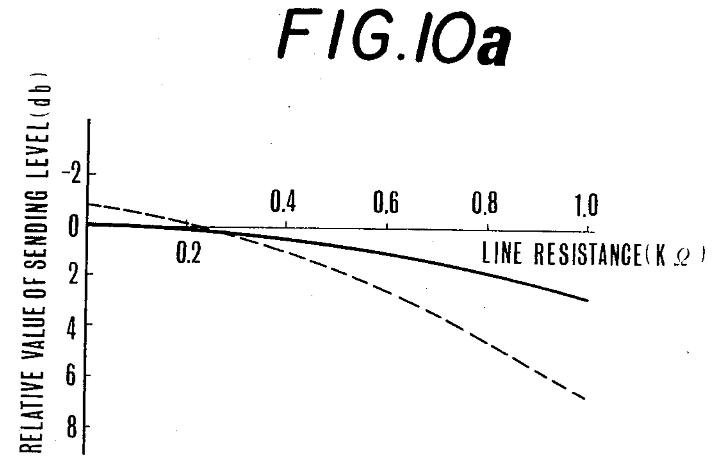
FIGS. 10*a*, 10*b* and 10*c* show characteristic curves of the novel telephone circuit.
Figure 10B:
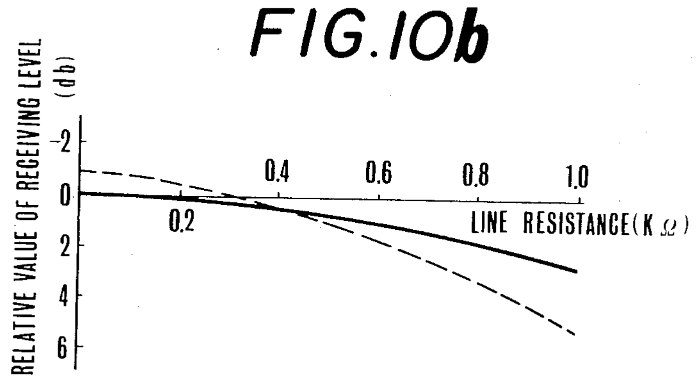
Figure 10C:
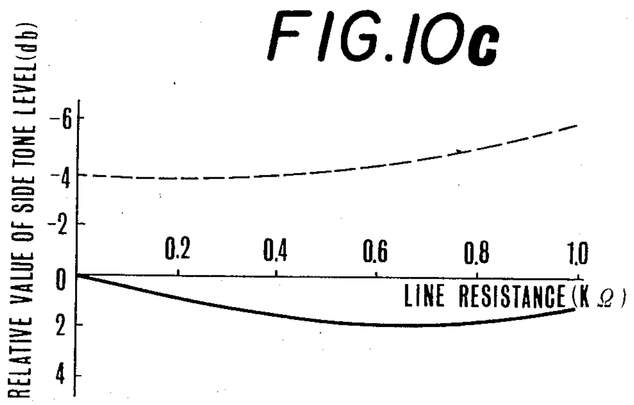

FIGS. 10*a*, 10*b* and 10*c* compare the characteristics of the novel telephone circuit and of a prior art telephone circuit. FIG. 10*a* shows line resistance viz. relative value of sending level characteristics, FIG. 10*b* the line resistance viz. relative value of receiving level characteristics while FIG. 10*c* the line resistance viz. relative value of side tone characteristics wherein solid lines represent the characteristics of the novel telephone circuit whereas dotted lines those of a prior telephone circuit. These characteristic curves clearly show that when compared with the prior art circuit, the novel telephone circuit can greatly reduce the side tone and can assure communications of fairly uniform level in both the transmitter and receiver for a subscriber's line of the length or type varying over a wide range.

Figures 11, 12:
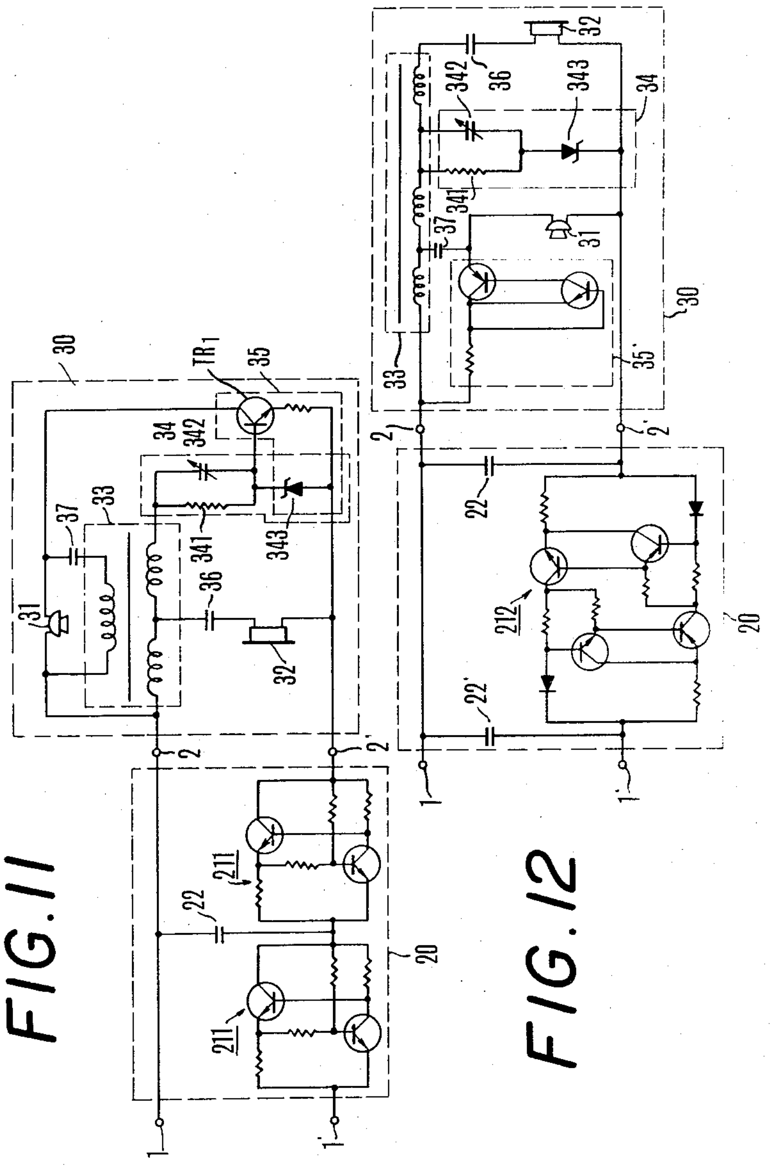
FIGS. 11 and 12 show connection diagrams of modified telephone circuits embodying the invention and FIG. 13 shows a connection diagram of this invention as applied to a push button dial type telephone set.

FIG. 11 shows a connection diagram of a more practical embodiment of this invention wherein the artificial subscriber's line 20 is shown as a T type circuit comprising a two terminal network 211 acting as the non-linear resistance elements and a capacitor 22, and a selenium rectifier element is used as the non-linear capacitor 342 of the balancing network 34. The electronic circuit shown in FIG. 7 is utilized as the constant direct current device 35, and the Zener diode 343 of balancing network 34 is also used to act as the Zener diode ZD shown in FIG. 7 for supplying a constant bias voltage for transistor TR1 which supplies a constant direct current to the transmitter 31.

Figure 6:
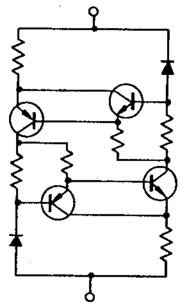

In another embodiment shown in FIG. 12, the artificial subscriber's line 20 is shown as a $\pi$ type circuit comprising the electronic circuit 212 shown in FIG. 6 and capacitors 22 and 22'. A barium titanate semiconductor ceramic is used as the non-linear capacitor of the balancing network 34. The constant direct current device 35 shown in the basic circuit and constructed as of FIG. 1 is comprised by the electronic circuit 35' shown in FIG. 3. The Zener diode of balancing network 34 is used as a D.C. bias source for the constant direct current device so as to supply a constant current to transmitter 31. The hybrid transformer 33 is of the booster type.

Figure 13:
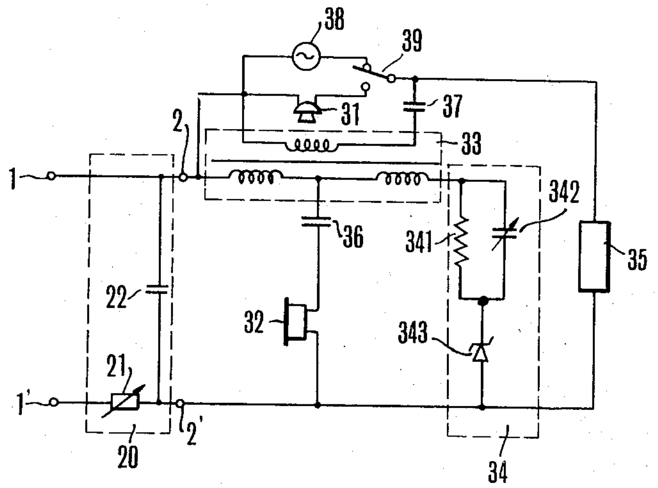

FIG. 13 shows a connection diagram of another embodiment wherein the invention is applied to a push button dial type telephone circuit. The push button type dial oscillator is designated by a symbol 38. In this type of telephone circuit, it is desirable to operate oscillator 38 independently of the transmitter in order to prevent interference caused by voice. For this purpose, a transfer switch 39 is provided. According to this invention, since constant direct current device 35 is used for normally supplying a constant current to the transmitter, when the constant direct current device 35 is connected to oscillator 38 through transfer switch 39 the oscillator will operate under the constant current. For this reason, the oscillator operates, stably irrespective of the length of the subscriber's line.

From the foregoing description it will be clear that the invention provides a novel telephone circuit which can effectively suppress the side tone and can maintain the sending and receiving level at a proper level for transmission as well as reception irrespective of the length or type of the subscriber's line which may vary over a wide range, without the necessity of adding anything or modifying the equipment in the telephone office. In addition, the invention can eliminate variation in the sensitivity of the transmitter due to the direct current supplied thereto, thereby reducing the size and weight of the hybrid transformer.

Although the invention has been shown and described in terms of certain preferred embodiment thereof it should be understood that the invention is by no means limited thereto but many changes and modifications may be made without departing from the true spirit and scope of the invention as defined in the appended claims.

What is claimed is:

1. In a telephone circuit comprising an anti-sidetone circuit provided with a hybrid transformer and four terminal pairs, the first terminal pair being connected to receiving means, the second terminal pair being connected to transmitting means and the third terminal pair being connected to a balancing network, the improvement which comprises an artificial subscriber's line connected between telephone lines and the fourth terminal pair of said anti-sidetone circuit; said artificial subscriber's line including at least one capacitor connected in parallel with said telephone lines and said fourth terminal pair, and at least one non-linear resistor connected in series with said telephone lines and said fourth terminal pair, said non-linear resistor varying its resistance in accordance with the direct current flowing through said telephone lines; at least one non-linear capacitor element included in said balancing network, said capacitor varying its capacitance in accordance with the D.C. voltage across said telephone lines; and a constant direct current device connected in series with said transmitting means.

2. The telephone circuit according to claim 1 wherein said artificial subscriber's line is an L type circuit comprising a non-linear resistance element connected in series with said telephone lines, and a capacitance element connected in parallel with said telephone lines.

3. The telephone circuit according to claim 1 wherein said artificial subscriber's line is a T type circuit comprising two non-linear resistance elements serially connected with said telephone lines and a capacitance element connected in parallel with said telephone lines.

4. The telephone circuit according to claim 1 wherein said artificial subscriber's line is a $\pi$ type circuit comprising a non-linear resistance element connected in series with said telephone lines and two capacitance elements connected in parallel with said telephone lines.

5. The telephone circuit according to claim 1 wherein said balancing network comprises a resistor, a non-linear capacitance element connected in parallel with said resistor and which varies its capacitance in accordance with the D.C. voltage across said telephone lines, and at least one constant voltage diode connected in series with said parallel connected resistor and non-linear capacitance element.

6. The telephone circuit according to claim 5 wherein said non-linear capacitance element comprises a reversely biased selenium rectifier element.

7. The telephone circuit according to claim 5 wherein said non-linear capacitance element comprises a barium titanate semiconductor ceramic.

8. In a telephone circuit provided with an anti-sidetone circuit comprising transmitting means, receiving means, a balancing network and a hybrid transformer intercoupling said transmitting means, said receiving means and the balancing network, the improvement which comprises an artificial subscriber's line connected between telephone lines and said telephone circuit, said artificial subscriber's line including at least one capacitance element and at least one non-linear resistance element which varies its resistance in accordance with the D.C. voltage across said telephone lines; a non-linear capacitance element included in said balancing network, said non-linear capacitance element varying its capacitance in accordance with the D.C. voltage across said telephone lines; and a constant direct current device connected in series with said transmitting means.

9. The telephone circuit according to claim 8 wherein a series circuit including said transmitting means and constant direct current device is connected in parallel with said balancing network.

10. The telephone circuit according to claim 8 wherein a capacitor is provided for preventing the current from said source of constant direct current from flowing through one winding of said hybrid coil.

11. The telephone circuit according to claim 8 wherein said constant direct current device comprises a transistor circuit and a Zener diode included in said balancing network.

12. The telephone circuit according to claim 8 which further comprises a push button dial type oscillator connected in parallel with said transmitting means and a transfer switch adapted to selectively connect said transmitting means and said push button dial type oscillator with said constant direct current device.

* * * * *